US012718640B2

(12) United States Patent
Stoddart et al.

(10) Patent No.: US 12,718,640 B2
(45) Date of Patent: Aug. 25, 2026

(54) SYSTEMS AND METHODS FOR TRACKING ACCESS TO AN AREA USING ULTRA-WIDEBAND RADIO TECHNOLOGY

(71) Applicant: VeriFone, Inc., Wilmington, DE (US)

(72) Inventors: Ian Matthew Stoddart, Leeds (GB); Thomas Arthur Potter, Nevada City, CA (US)

(73) Assignee: VeriFone, Inc., Wilmington, DE (US)

( * ) Notice: Subject to any disclaimer, the term of this patent is extended or adjusted under 35 U.S.C. 154(b) by 55 days.

(21) Appl. No.: 18/573,727

(22) PCT Filed: Jun. 25, 2021

(86) PCT No.: PCT/US2021/039216
§ 371 (c)(1),
(2) Date: Dec. 22, 2023

(87) PCT Pub. No.: WO2022/271188
PCT Pub. Date: Dec. 29, 2022

(65) Prior Publication Data

US 2024/0331472 A1 Oct. 3, 2024

(51) Int. Cl.
*G07C 9/10* (2020.01)
*G01S 7/00* (2006.01)
(Continued)

(52) U.S. Cl.
CPC ................ *G07C 9/10* (2020.01); *G01S 7/006* (2013.01); *G01S 13/765* (2013.01); *G07B 15/04* (2013.01); *G07C 2209/63* (2013.01)

(58) Field of Classification Search
CPC ........ G07C 9/10; G07C 2209/63; G07C 9/20; G07C 9/00309; G01S 7/006; G01S 13/765; G07B 15/04
See application file for complete search history.

(56) References Cited

U.S. PATENT DOCUMENTS 9,538,332 B1 * 1/2017 Mendelson ........... H04W 48/10
9,674,684 B1 * 6/2017 Mendelson ........... H04W 4/029
(Continued)

FOREIGN PATENT DOCUMENTS

WO 2020043346 A1 3/2020

OTHER PUBLICATIONS

International Search Report and the Written Opinion of the International Searching Authority, PCT Application No. PCT/US2021/039216, pp. 1-19, dated Sep. 24, 2021.
(Continued)

*Primary Examiner* — Thien M Le
*Assistant Examiner* — Asifa Habib
(74) *Attorney, Agent, or Firm* — Bond, Schoeneck & King, PLLC

(57) ABSTRACT

A payment terminal computer program may track entry to, presence in, and exit from an area using ultrawideband (UWB) radio technology by: receiving, from an UWB radio, first information to determine a first distance between a UWB radio-enabled mobile electronic device and the UWB radio or a first position of the UWB radio-enabled mobile electronic device; determining that the UWB radio-enabled mobile electronic device is at an entrance to the area based on the first distance or position; receiving, from the UWB radio, second information to determine a second distance between the UWB radio-enabled mobile electronic device and the UWB radio or a second position of the UWB radio-enabled mobile electronic device; determining that the UWB radio-enabled mobile electronic device is at an exit from the area based on the second distance or position; and determining a fee based on the first communication and the second communication.

13 Claims, 6 Drawing Sheets

(51) Int. Cl.
*G01S 13/76* (2006.01)
*G07B 15/04* (2006.01)

(56) References Cited

U.S. PATENT DOCUMENTS 9,715,773 B2* 7/2017 Clemente ................. G07C 9/20
10,304,275 B2* 5/2019 Dyne ..................... G07B 15/04
2014/0253291 A1* 9/2014 Kennedy ............ G06K 7/10306 340/10.1
2015/0081532 A1* 3/2015 Lewis .................... G06Q 90/20 705/346
2015/0095123 A1* 4/2015 Wenninger ............. G07B 15/04 705/13
2016/0140846 A1* 5/2016 Outwater ............... G08G 1/144 340/932.2
2016/0321925 A1* 11/2016 Al Suwaidi .......... G08G 1/0175
2018/0211539 A1* 7/2018 Boss ...................... G08G 1/168
2018/0349653 A1 12/2018 Al-Kadi et al.
2019/0098499 A1 3/2019 Lerch et al.
2019/0108700 A1* 4/2019 Chelnik ................. G07B 15/02
2020/0064444 A1* 2/2020 Regani .................... G01S 7/006
2020/0182995 A1* 6/2020 Zeng ..................... G01S 13/003
2020/0242924 A1* 7/2020 Publicover ............. G08G 1/087
2020/0356957 A1* 11/2020 Swift ................. G06Q 10/1097
2021/0170991 A1* 6/2021 Parthasarathi .......... H04W 4/48
2021/0190702 A1* 6/2021 Wu ......................... G01S 7/411
2022/0013013 A1* 1/2022 Chen .................. G07C 9/00309
2024/0331472 A1* 10/2024 Stoddart .................. G07C 9/20

OTHER PUBLICATIONS

Communication Pursuant to Rules 70(2) and 70A(2) EPC, EP Patent Application No. 21947352.7, dated Mar. 18, 2025, 1 page.
European Search Report, EP Patent Application No. 21947352.7, dated Feb. 28, 2025, pp. 1-9.

* cited by examiner

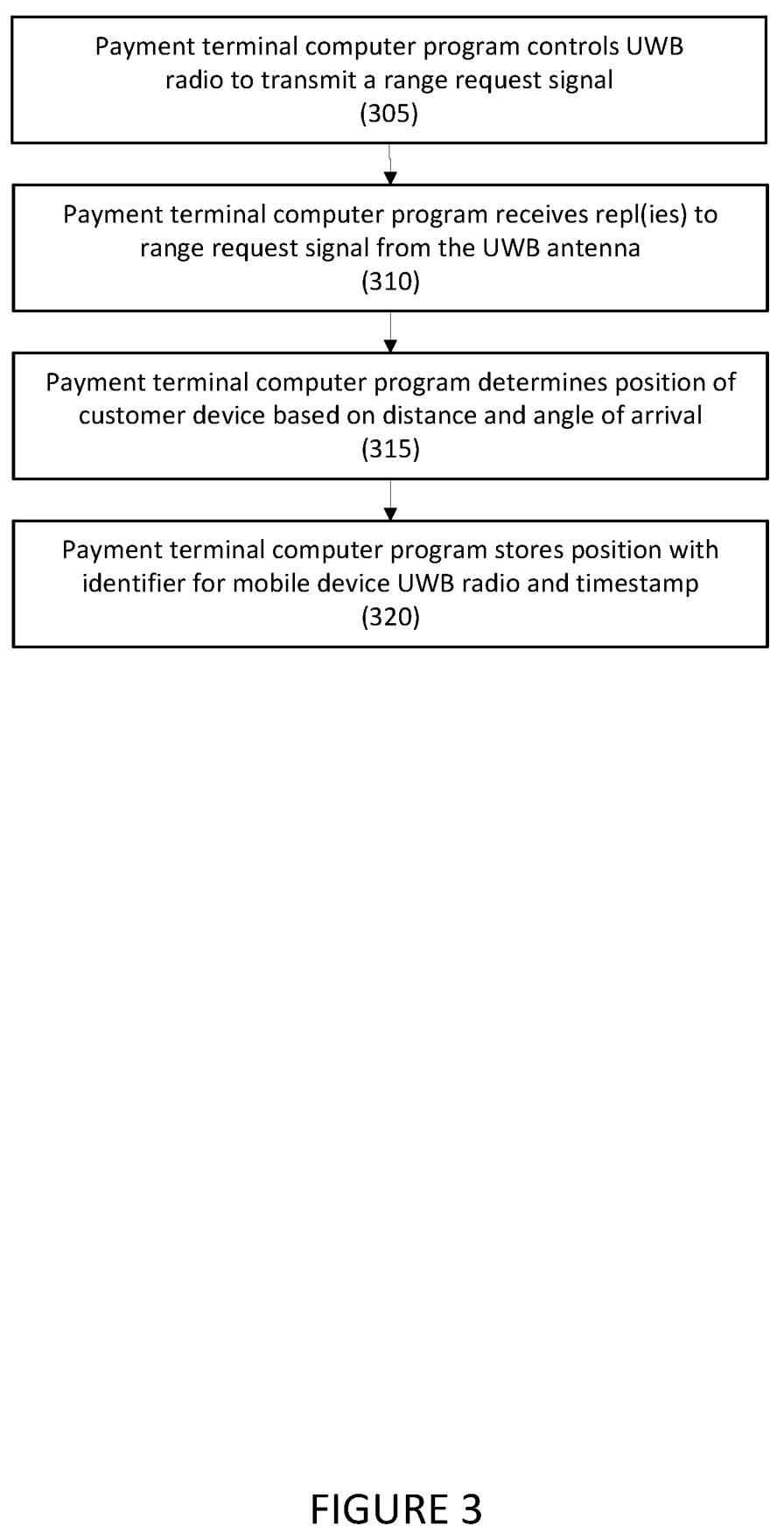

Payment terminal computer program controls UWB radio to transmit a range request signal (305)

↓

Payment terminal computer program receives repl(ies) to range request signal from the UWB antenna (310)

↓

Payment terminal computer program determines position of customer device based on distance and angle of arrival (315)

↓

Payment terminal computer program stores position with identifier for mobile device UWB radio and timestamp (320)

FIGURE 3

Payment terminal computer program receives a first communication from UWB radio and determines that a mobile electronic device is at an entrance to a first sub-area of an area (405)

Payment terminal computer program stores identifier for mobile device UWB radio and first timestamp for first communication (410)

(Optional) Payment terminal computer program receives a second communication from UWB radio and determine that the mobile electronic device is in a second sub-area of the area (415)

(Optional) Payment terminal computer program stores identifier for mobile device UWB radio and second timestamp for second communication and second position (420)

Payment terminal computer program receives a third communication from UWB radio and determines that the mobile electronic device is at an exit of the first sub-area of the area (425)

Payment terminal computer program stores identifier for mobile device UWB radio and third timestamp for third communication and third position (430)

Payment terminal computer program determines base fee based on first timestamp and third timestamp (435)

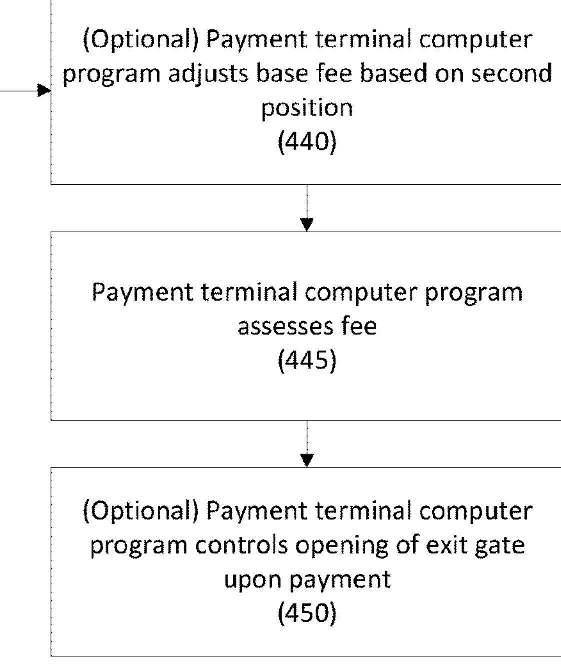

FIGURE 4

SYSTEMS AND METHODS FOR TRACKING ACCESS TO AN AREA USING ULTRA-WIDEBAND RADIO TECHNOLOGY

CROSS-REFERENCE TO RELATED APPLICATIONS

The present application is a United States National Stage Application pursuant to 35 U.S.C. § 371 of International Patent Application No. PCT/US2021/039216, filed Jun. 25, 2021, and entitled "Systems and Methods for Tracking Access to an Area Using Ultra-Wideband Radio Technology," the entire disclosure of which is hereby incorporated by reference in its entirety.

BACKGROUND OF THE INVENTION

1. Field of the Invention

The present disclosure relates generally to systems and methods for tracking access to an area using ultra-wideband radio technology.

2. Description of the Related Art

Many everyday activities require paid access to enter an area, such as paying for parking a vehicle in a parking garage or lot, paying to attend a concert or sporting event at a venue, etc. To enter the area, a customer can either pay in advance, such as when paying to enter a concert venue, or may pay after, such as paying for parking when leaving the parking garage or lot. Sometimes multiple tiers or access levels may be provided, such as a premium tier, a standard tier, and a discount tier. Premium tier access typically costs more than standard tier access, and discount tier access typically costs less than standard tier access. Regardless, access to the non-standard tiers usually requires the user to decide in advance, so that he or she can pre-pay or receive a ticket so they can post-pay upon departure.

SUMMARY OF THE INVENTION

Systems and methods for tracking access to an area using ultra-wideband radio technology are disclosed. In one embodiment, a method for tracking entry to, presence in, and exit from an area using ultrawideband (UWB) radio technology may include: (1) receiving, by a payment terminal computer program executed on a payment terminal and from an UWB radio, a first communication comprising first information for the payment terminal computer program to determine a first distance between a UWB radio-enabled mobile electronic device and the UWB radio: (2) determining, by the payment terminal computer program, that the UWB radio-enabled mobile electronic device is at an entrance to the area based at least in part on the first distance: (3) receiving, by the payment terminal computer program and from the UWB radio, a second communication comprising second information for the payment terminal computer program to determine a second distance between the UWB radio-enabled mobile electronic device and the UWB radio: (4) determining, by the payment terminal computer program, that the UWB radio-enabled mobile electronic device is at an exit from the area based at least in part on the second distance: (5) determining, by the payment terminal computer program, a fee based on the first communication and the second communication; and (6) controlling, by the payment terminal computer program, an access control device in response to receipt of the fee.

In one embodiment, the method may further include: storing, by the payment terminal computer program, a first timestamp for the first communication and an identifier for a mobile electronic device in the UWB radio-enabled mobile electronic device; and storing, by the payment terminal computer program, a second timestamp for the second communication and the identifier for a mobile electronic device in the UWB radio-enabled mobile electronic device.

In one embodiment, the fee may be based on a time difference between the second timestamp and the first timestamp.

In one embodiment, the fee may be a flat fee.

In one embodiment, the method may further include: receiving, by the payment terminal computer program and from the UWB radio, a third communication comprising third information for the payment terminal computer program to determine a third distance between the UWB radio-enabled mobile electronic device and the UWB radio; determining, by the payment terminal computer program, that the UWB radio-enabled mobile electronic device is in a sub-area of the area based at least in part on the third distance; and adjusting, by the payment terminal computer program, the fee based on the determination.

In one embodiment, the sub-area may be a premium area and the fee may be adjusted by increasing the fee; or the sub-area may be a discount area and the fee may be adjusted by decreasing the fee.

In one embodiment, the first information may include first time of flight information between the UWB radio and the UWB radio-enabled mobile electronic device, and the second information may include second time of flight information between the UWB radio and the UWB radio-enabled mobile electronic device.

According to another embodiment, a method for tracking entry to, presence in, and exit from an area using ultrawideband (UWB) radio technology may include: (1) receiving, by a payment terminal computer program executed on a payment terminal and from a first UWB radio, a first communication comprising first information for the payment terminal computer program to determine a first distance between a UWB radio-enabled mobile electronic device and the first UWB radio: (2) determining, by the payment terminal computer program, that the UWB radio-enabled mobile electronic device is at an entrance to the area based at least in part on the first distance: (3) receiving, by the payment terminal computer program and from a second UWB radio, a second communication indicating presence of the UWB radio-enabled mobile electronic device in a sub-area of the area; (4) receiving, by the payment terminal computer program and from the first UWB radio, a third communication comprising third information for the payment terminal computer program to determine a third distance between the UWB radio-enabled mobile electronic device and the first UWB radio; (5) determining, by the payment terminal computer program, that the UWB radio-enabled mobile electronic device is at an exit from the area based on the third distance; (6) determining, by the payment terminal computer program, a fee based on the first communication and the third communication: (7) adjusting, by the payment terminal computer program, the fee based on the second communication; and (8) controlling, by the payment terminal computer program, an access control device in response to receipt of the fee.

In one embodiment, the method may further include: storing, by the payment terminal computer program, a first timestamp for the first communication and an identifier for a mobile electronic device in the UWB radio-enabled mobile electronic device; storing, by the payment terminal computer program, a second timestamp for the second communication and the identifier for a mobile electronic device in the UWB radio-enabled mobile electronic device; and storing, by the payment terminal computer program, a third timestamp for the third communication and the identifier for a mobile electronic device in the UWB radio-enabled mobile electronic device.

In one embodiment, the fee may be based on a time difference between the third timestamp and the first timestamp.

In one embodiment, the fee may be a flat fee.

In one embodiment, the sub-area may be a premium area and the fee may be adjusted by increasing the fee; or the sub-area may be a discount area and the fee may be adjusted by decreasing the fee.

In one embodiment, the first information may include first time of flight information between the first UWB radio and the UWB radio-enabled mobile electronic device, and the third information may include second time of flight information between the first UWB radio and the UWB radio-enabled mobile electronic device.

According to another embodiment, a payment terminal device may include: a computer processor: a memory comprising a payment terminal computer program; and an ultra-wideband (UWB) radio comprising a plurality of antennas. The payment terminal computer program may be configured to: receive a first communication from the UWB radio comprising first information for the payment terminal computer program to determine a first position of a UWB radio-enabled mobile electronic device; determine that the UWB radio-enabled mobile electronic device is at an entrance to an area based at least in part on the first position; receive a second communication from the UWB radio comprising second information for the payment terminal computer program to determine a second position of the UWB radio-enabled mobile electronic device; determine that the UWB radio-enabled mobile electronic device is at an exit from the area based at least in part on the second position; determine a fee based on the first communication and the second communication; and control an access control device in response to receipt of the fee.

In one embodiment, the payment terminal device may be further configured to: store a first timestamp for the first communication and an identifier for a mobile electronic device in the UWB radio-enabled mobile electronic device; and store a second timestamp for the second communication and the identifier for a mobile electronic device in the UWB radio-enabled mobile electronic device. The fee may be based on a time difference between the second timestamp and the first timestamp.

In one embodiment, the payment terminal computer program may be further configured to: receive a third communication from the UWB radio comprising third information for the payment terminal computer program to determine a third position of the UWB radio-enabled mobile electronic device; determine that the UWB radio-enabled mobile electronic device is in a sub-area of the area based at least in part on the third position; and adjust the fee based on the determination.

In one embodiment, the sub-area may be a premium area and the fee may be adjusted by increasing the fee: or the sub-area may be a discount area and the fee may be adjusted by decreasing the fee.

In one embodiment, the payment terminal computer program may be further configured to: receive a third communication from a second UWB radio indicating presence of the UWB radio-enabled mobile electronic device in a sub-area of the area; and adjust the fee based on the presence of the UWB radio-enabled mobile electronic device in the sub-area of the area.

In one embodiment, the sub-area may be a premium area and the fee may be adjusted by increasing the fee: or the sub-area may be a discount area and the fee may be adjusted by decreasing the fee.

In one embodiment, the first information may include first time of flight information between the UWB radio and the UWB radio-enabled mobile electronic device, and the second information may include second time of flight information between the UWB radio and the UWB radio-enabled mobile electronic device.

BRIEF DESCRIPTION OF THE DRAWINGS

For a more complete understanding of the present invention, the objects and advantages thereof, reference is now made to the following descriptions taken in connection with the accompanying drawings in which:

FIG. 3 depicts a method for determining a distance between a UWB radio and a mobile electronic device according to one embodiment:

FIG. 4 depicts a method for tracking access to an area using ultra-wideband radio technology according to one embodiment:

DETAILED DESCRIPTION OF PREFERRED EMBODIMENTS

Embodiments are directed to systems and methods for tracking access to an area using ultrawideband radio technology.

Ultra-wideband, or UWB, is a radio technology that uses low energy for short-range, high-bandwidth communications (e.g., over 500 MHZ) over a large portion of the radio spectrum. The time of flight of a UWB signal—the time it takes a signal to be transmitted, and a reply to that signal to be received from the other UWB radio—may be used to determine a distance between the UWB radios. In contrast, other technologies, such as Bluetooth Low Energy (BLE) and WiFi, generally use Received Signal Strength Indicator, or RSSI, to estimate distances based on the signal strength of a received signal. Because BLE and WiFi are primarily designed to transmit data, they use narrow band signalling with long data packets. This is inherently prone to interference within the packet, which introduces difficulty and errors into determining a time of flight for these signals. Further, any shielding encountered by the Bluetooth or WiFi signal may make devices appear to be further apart than they are, further reducing the accuracy of any distance determinations based on RSSI and time of flight.

Figure 1:
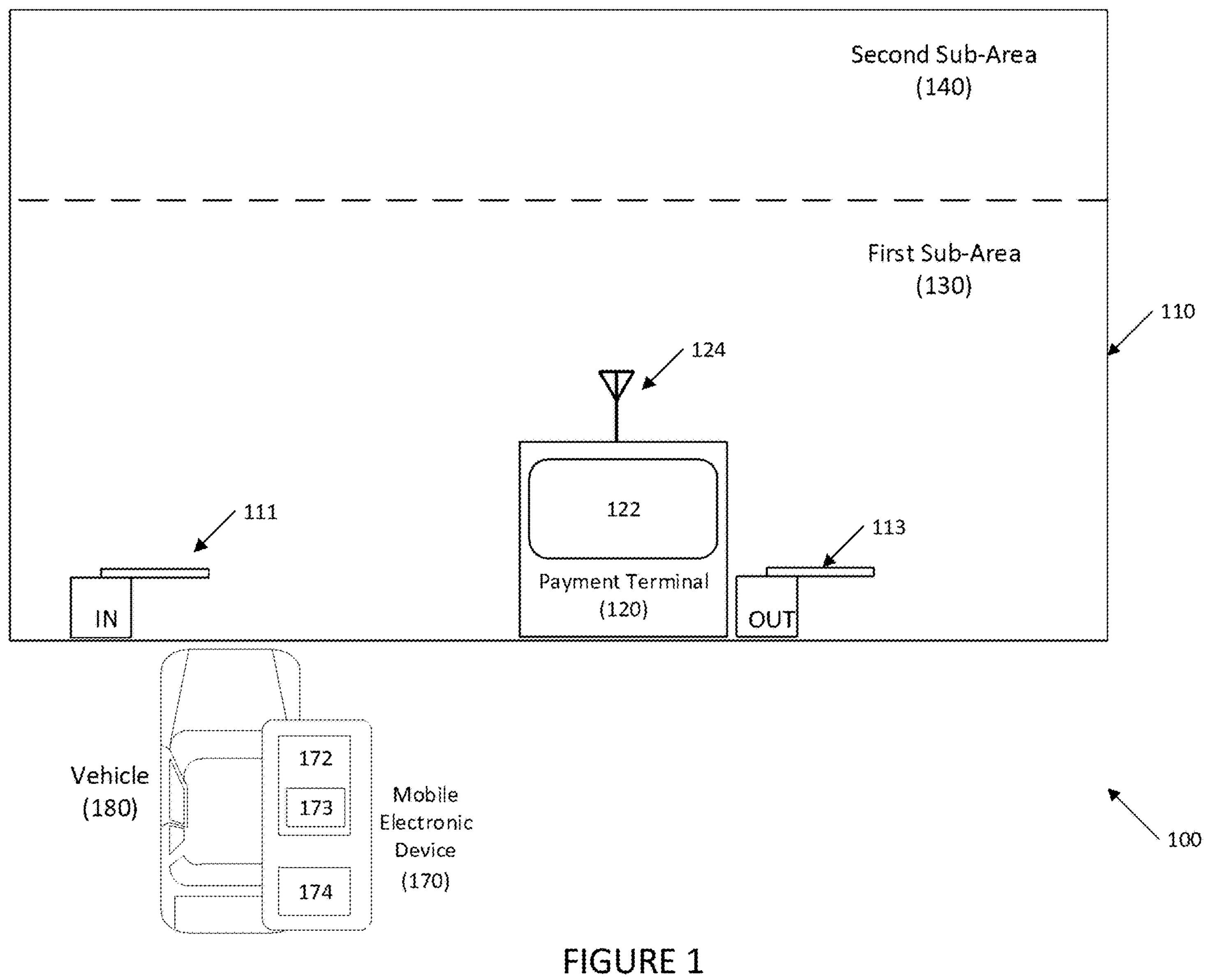
FIG. 1 depicts a system for tracking access to an area using ultra-wideband radio technology according to one embodiment.

Referring to FIG. 1, a system for tracking entry to, presence in, and exit from an area using UWB radio technology is disclosed according to an embodiment. For example, a single UWB radio may be used to monitor distances between the UWB radio and a UWB-enabled device, such as a mobile electronic device, in order to track entry to, presence in, and exit from an area.

System 100 may include area 110, which may be an area that a user may wish to access. Area 110 may be any type of area with access restrictions, such as parking garages, sporting venues, movie theaters, concert halls, clubs, etc. Area 110 may include entry 111 and exit 113. Entry 111 and exit 113 may allow the entry of pedestrians, vehicles, etc. In one embodiment, entry 111 and exit 113 may include access control devices, such as turnstiles, gates, or other sensing devices (e.g., electric eyes, pressure pads or mats, etc.).

Area 110 may comprise a single area for which access thereto may be charged at a standard rate. The standard rate may be based on access to the area (e.g., a flat fee that is charged regardless of the time spent in area 110), a time-based rate (e.g., based on minutes, hours, days, etc. spent in area 110), etc. The standard rate may be considered to be a base rate for access to area 110.

In one embodiment, area 110 may include one or more sub-areas that may have different rates, such as first sub-area 130 and second sub-area 140. Additional sub-areas may be included as is necessary and-or desired. For example, first sub-area 130 may have the standard rate, and second sub-area 140 may have a discount rate (e.g., if second sub-area is a less desirable area than first sub-area 130, such as being further from a focal point, such as a screen, airport terminal, etc.) or a premium rate (e.g., if second sub-area is a more desirable area than first sub-area 130, such as being closer to a focal point, such as a screen, airport terminal, being a VIP area, etc.) depending on the configuration of area 110.

In one embodiment, first sub-area 130 and second sub-area 140 may be separated by a physical barrier: in another embodiment, indicators, such as signs, may differentiate first sub-area 130 and second sub-area 140. For example, certain parking spaces may be marked as premium parking spaces, as discount parking spaces, etc.

Figure 2:
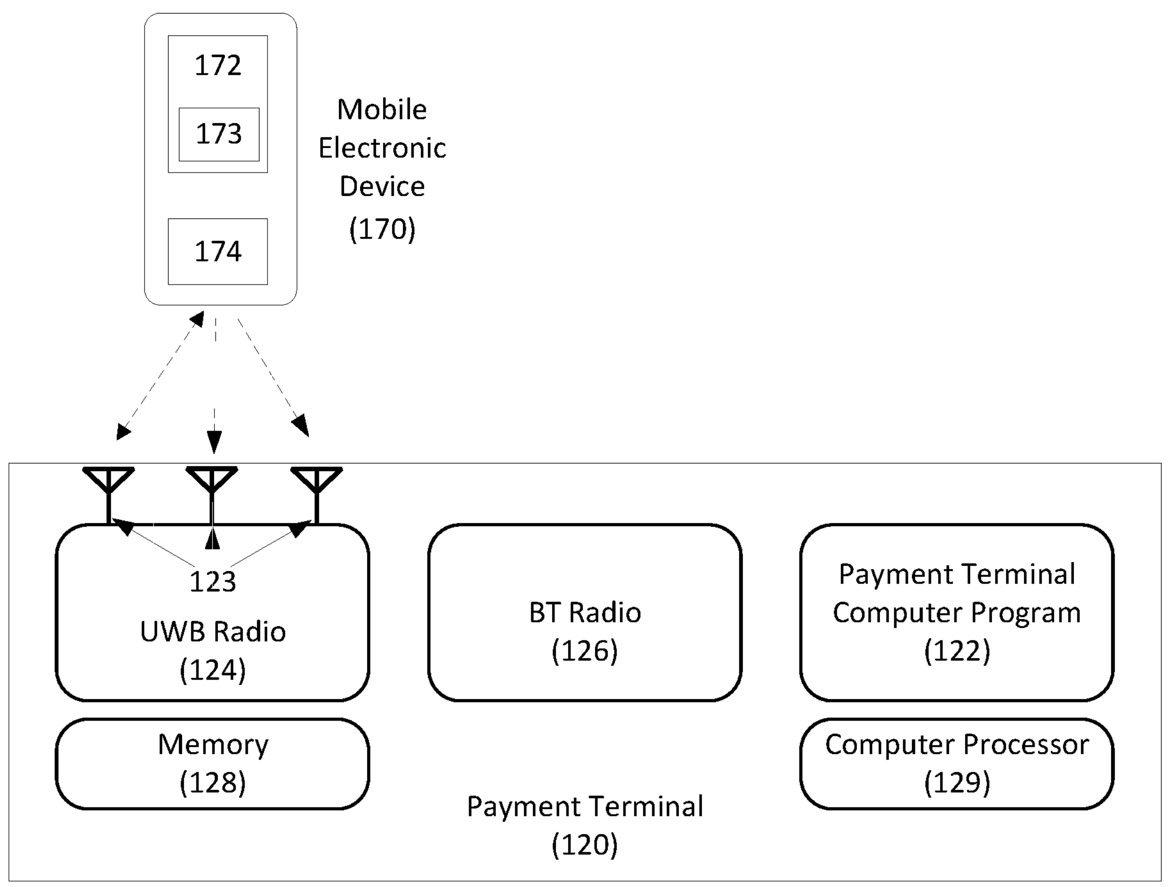
FIG. 2 illustrates a UWB radio is provided according to one embodiment.

Area 110 may include payment terminal 120. Payment terminal 120 may be any suitable payment terminal, such as a kiosk, point of sale device, etc. Payment terminal 120 may be co-located with exit 113 from area 110. A more detailed illustration of payment terminal 120 according to one embodiment is provided in FIG. 2. Payment terminal 120 may include payment terminal computer program 122, UWB radio 124, Bluetooth radio 126, and one or more computer processor 129. UWB radio 124 may include a plurality of antennas 123. One antenna 123 may be used to transmit UWB signals to, for example, mobile electronic device UWB radio 172 on mobile electronic device 170, and both antennas 123 may receive signals from mobile electronic device UWB radio 172. FIG. 2 depicts three antennas 123; additional antennas 123 may be used as is necessary and/or desired.

Two antennas 123 may be required to determine the angle of arrival, as the angle of arrival is calculated from either the time or phase difference between the same signal received at each of the antennas 123. With two antennas 123, however, there may be uncertainty with regard to which side of antennas 123 mobile electronic device 170 is located, and the positioning of antennas 123 may be used to assist in determining the side (e.g., antennas 123 may be positioned so that it is physically impossible for mobile electronic device 170 to be on one side of the antennas 123). With three antennas 123, the positioning of mobile electronic device 170 is absolute.

Using UWB radio 124, payment terminal computer program 122 may identify a distance between antennas 123 and mobile electronic device UWB radio 172. In one embodiment, payment terminal computer program 122 may cause UWB radio 124 to transmit a range request signal (e.g., a signal containing a range request packet) from at least one of antennas 123, and each antenna 123 may receive a reply signal from mobile electronic device UWB radio 172. The reply signal may include identifier 173 for mobile electronic device UWB radio 172, such as a Device Identifier or Device ID. Payment terminal computer program 122 may then use the round-trip times of flight for the range request signal and the reply signal received by each antenna 123 to determine the distance between UWB radio 124 and mobile electronic device UWB radio 172. In one embodiment, payment terminal computer program 122 may further use the angles of arrival of each reply signal determine the position of mobile electronic device UWB radio 172. Examples of protocols for using UWB ranging are disclosed in E. Parasystole et al. "An overview of the IEEE 802.15.4a Standard," in *IEEE Communications Magazine*, vol. 48, no. 1, pp. 47-53 (January 2010), the disclosure of which is hereby incorporated, by reference, in its entirety.

In one embodiment, payment terminal computer program 122 may compare the determined position for mobile electronic device UWB radio 172 to a predetermined distance from UWB radio 124 in order to determine the physical location of mobile electronic device UWB radio 172 in area 110. For example, if mobile electronic device UWB radio 172 is within a predetermined distance of UWB radios 124 (e.g., within two feet), payment terminal computer program 122 may determine that mobile electronic device UWB radio 172 is exiting area 110 at exit 113. If mobile electronic device UWB radio 172 is within a certain distance of UWB radio 124, payment terminal computer program 122 may determine that mobile electronic device UWB radio 172 is in first sub-area 130. If mobile electronic device UWB radio 172 is beyond a certain distance from UWB radio 124, payment terminal computer program 122 may determine that mobile electronic device UWB radio 172 is in second sub-area 140.

In one embodiment, payment terminal computer program 122 may control UWB radio 124 to periodically determine the distance between UWB radio 124 and mobile electronic device UWB radio 172, for example, every 10 seconds, minute, 5 minutes, etc. In another embodiment, payment terminal computer program 122 may control UWB radio 124 to determine the distance between UWB radio 124 and mobile electronic device UWB radio 172 in response to an event, such as the operation of an egress-control mechanism, turnstile, gate, or other sensing device (e.g., electric eye, pressure pad or mat, etc.) indicating that mobile electronic device 170 entered and/or exited an area.

In one embodiment, in order to be identified by UWB radio 124, mobile electronic device UWB radio 172 may be required to be turned on. In one embodiment, Bluetooth radio 126 or a separate radio (not shown) may communicate a signal (e.g., a RF signal) that may result in mobile electronic device UWB radio 172 on mobile electronic device 170 turning on or otherwise becoming active. For example, Bluetooth radio 126 may emit a BLE signal, such as a beacon frame, that may be received by a radio (e.g., a Bluetooth radio) on mobile electronic device 170 (not shown) that may cause the operating system on mobile electronic device 170 to turn on or otherwise activate mobile electronic device UWB radio 172. In another embodiment, payment terminal computer program 122 may control UWB radio 124 to send the beacon frame that may also result in mobile electronic device UWB radio 172 on mobile electronic device 170 turning on or otherwise becoming active.

In one embodiment, payment terminal 120 may store an identifier for mobile electronic device 170 and/or an identifier 173 for mobile electronic device UWB radio 172 in memory 128. For example, payment terminal 120 may store identifier 173 for mobile electronic device UWB radio 172 that is received in a communication from mobile electronic device UWB radio 172 in memory 128. Memory 128 may further store distances between UWB radio 124 and mobile electronic device 170 with timestamps Referring again to FIG. 1, although only one UWB radio 124 is depicted, additional UWB radios may be provided as is necessary and/or desired and may be in wired and/or wireless communication with payment terminal 120 and payment terminal computer program 122. The number of UWB radios in area 110 may depend on the size and/or configuration of area 110.

Mobile electronic device 170 may be any suitable mobile electronic device, such as a smartphone, a tablet computer, a smart watch, an Internet of Things (IoT) appliance, etc. In one embodiment, mobile electronic device 170 may be incorporated into, for example, vehicle 180. Mobile electronic device 170 may include mobile electronic device UWB radio 172 and application 174. Application 174 may be any suitable application, such as a payment application, an application associated with area 110 (e.g., a parking app, a ticket provider app, etc.), etc.

Referring to FIG. 3, a method for determining a distance between a UWB radio associated with the payment terminal 120 and a mobile electronic device is disclosed according to an embodiment.

In step 305, a payment terminal computer program 122 executed by a payment terminal may control a UWB radio to identify a UWB-enabled mobile electronic device. In one embodiment, the payment terminal computer program 122 may control a UWB radio to transmit a range request signal from a first UWB antenna. In another embodiment, a plurality of antennas may transmit UWB signals.

In step 310, the payment terminal computer program 122 may receive a pair of replies to the range request signal—a first reply at the first UWB antenna and a second reply at a second UWB antenna—from UWB radio 124. In one embodiment, the replies may be from UWB radios on one or more mobile electronic device.

In step 315, the payment terminal computer program 122 may determine a distance from the antenna(s) and the mobile electronic device UWB radio based on the time of flight of the range request signal and the reply signal. In one embodiment, the time of flight calculation may be either based on the reply signal received from one antenna or a calculation based on the reply signal received at both antennas.

In one embodiment, the payment terminal computer program 122 may further use the angle of arrival for the replies to determine a position of the mobile electronic device. For example, the angle of arrival may use one or both of time difference between the reply signals received at each antenna, and a phase difference between the signal received at each antenna.

In embodiments, the payment terminal computer program 122 may transmit multiple range request signals, and may receive multiple replies, and may determine multiple distances. The payment terminal computer program 122 may average the distances as desired.

In step 320, the payment terminal computer program 122 may store the distance from the UWB radio(s) and the mobile electronic device UWB radio 172 with identifier 173 for mobile electronic device UWB radio 172 and a timestamp in memory 128. In another embodiment, the payment terminal computer program 122 may also store an identifier for the area or sub-area for the UWB radio closest to the mobile electronic device UWB radio 172 in memory 128.

Referring to FIG. 4, a method for tracking entry to, presence in, and exit from an area using ultrawideband radio technology is disclosed according to an embodiment. For example, a single UWB radio may be used to monitor distances between the UWB radio and a UWB-enabled device, such as a mobile electronic device.

In step 405, a payment terminal computer program 122 executed on a payment terminal may receive a first communication from a UWB radio 124 and may determine that a mobile electronic device is positioned at an entry for an area. In one embodiment, the first communication may include information for payment terminal computer program 122 to determine the distance between the UWB radio 124 and the mobile electronic device UWB radio 172. Payment terminal computer program 122 may then determine the position based at least in part on the distance. For example, the payment terminal computer program 122 may determine that the mobile electronic device 170 is at the entry when the distance between the UWB radio 124 at the payment terminal and the mobile electronic device UWB radio 172 is the same as a known distance between the UWB radio 124 at the payment terminal and the entry, and when the UWB radio 124 identifies the mobile electronic device UWB radio 172 on the mobile electronic device 170 for the first time.

The communication from the mobile electronic device UWB radio 172 may include an identifier 173 for mobile electronic device UWB radio 172 and a first timestamp associated with the first communication. In step 410, the payment terminal computer program 122 may store the identifier 173 for mobile electronic device UWB radio 172 and the first timestamp for the first communication.

In optional step 415, if the area is configured to include more than one sub-area, the payment terminal computer program 122 may receive a second communication from the UWB radio and may determine that the mobile electronic device 170 in in a second sub-area of the area. In one embodiment, the second communication may include information for payment terminal computer program 122 to determine the distance between the UWB radio 124 and the mobile electronic device UWB radio 172. The payment terminal computer program 122 may then determine the relative position based at least in part on the distance. For example, the payment terminal computer program 122 may determine that the distance between the mobile electronic device UWB radio 172 is greater than the distance between the UWB radio 124 and the second sub-area. In optional step 420, the payment terminal computer program 122 may store the identifier 173 for mobile electronic device UWB radio 172 and a second timestamp for the second communication and an indication that the mobile electronic device is in the second sub-area in memory 128.

In step 425, the payment terminal computer program 122 may receive a third communication from the mobile electronic device UWB radio 172 and may determine that the mobile electronic device UWB radio 172 on the mobile electronic device 170 is positioned at an exit for the area. In one embodiment, the third communication may include information for payment terminal computer program 122 to determine the distance between the UWB radio 124 and the mobile electronic device UWB radio 172. The payment terminal computer program 122 may then determine the position based on the distance. For example, the payment terminal computer program 122 may determine that the mobile electronic device UWB radio 172 is within a certain distance (e.g., 2 feet) of the payment terminal. Because the payment terminal may be positioned near the exit, this indicates that the user is leaving the area. In step 430, the payment terminal computer program 122 may store the identifier 173 for mobile electronic device UWB radio 172 and a third timestamp for the third communication in memory 128.

In step 435, the payment terminal computer program 122 may determine a base fee for access to the area based at least in part on the first timestamp, which indicates the time of entry into the area, and the third timestamp, which indicates the time of exit from the area. In one embodiment, the base fee may be a flat fee, a time-based fee, may be based on the time of the first communication and/or the third communication (e.g., early bird/early departure), etc.

In optional step 440, the payment terminal computer program 122 may determine a secondary fee for the mobile electronic device based on the second communication. In one embodiment, the secondary fee may be a charge or a discount. For example, if the second communication indicates that the mobile electronic device UWB radio 172 was in a premium area, an additional charge may be levied. If the second communication indicates that the mobile electronic device UWB radio 172 was in a discount area, a discount may be provided. The base fee may then be adjusted by the secondary fee.

In one embodiment, if the second communications indicate that the mobile electronic device UWB radio 172 was in multiple areas, the venue may apply a policy to determine the secondary charge. For example, if the time spent in the premium area was under a threshold period of time no additional charge may be applied.

In step 445, the payment terminal computer program 122 may assess the fee for the access. In one embodiment, the payment terminal computer program 122 may charge an account on file associated with the mobile electronic device for the fee, may present the fee at an exit for automated or manual collection (e.g., credit card, account on file, etc.), etc. In step 450, once payment is received, the payment terminal computer program 122 may control an exit gate, turnstile, etc. at exit 113 to allow egress from the area once payment has been received.

Figure 5:
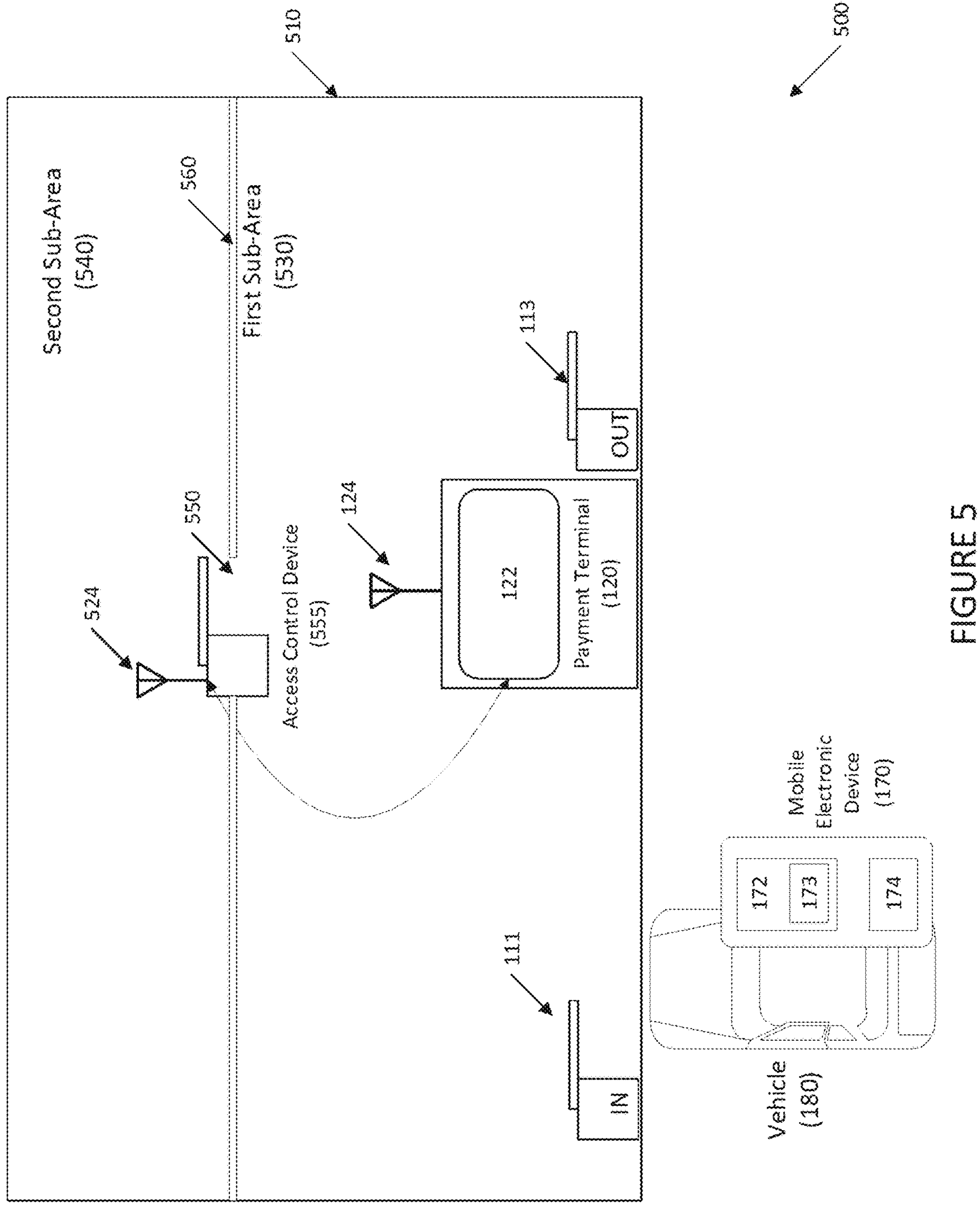
FIG. 5 depicts a system for tracking access to an area using ultra-wideband radio technology according to another embodiment.

Referring to FIG. 5, a system for tracking entry to, presence in, and exit from an area using ultrawideband radio technology is disclosed according to an embodiment. For example, multiple UWB radios may be used to monitor distances between the UWB radios and a UWB-enabled device, such as a mobile electronic device.

Area 510 may include first sub-area 530 and second sub-area 540 which may be separated by physical barrier 560, such as a fence, a wall, roping, etc. Access point 550 may provide access between first sub-area 530 and second sub-area 540. Access control device 555 may control access between first sub-area 530 and second sub-area 540. Access control device 555 may be any suitable access control mechanism, including turnstiles, gates, doors, electric eyes, etc. In one embodiment, access control device 555 may not provide a physical restriction for accessing second sub-area 540 from first sub-area 530, or vice-versa, but may provide a single point of traffic flow between the two areas.

System 500 may include second UWB radio 524. Second UWB radio 524 may be in wired and/or wireless communication with payment terminal computer program 122. Second UWB radio 524 may be located near access point 550, such as being collocated with access control device 555. In one embodiment, second UWB radio 524 may be configured to operate with a range that senses UWB radios passing through access point 550.

Figure 6:
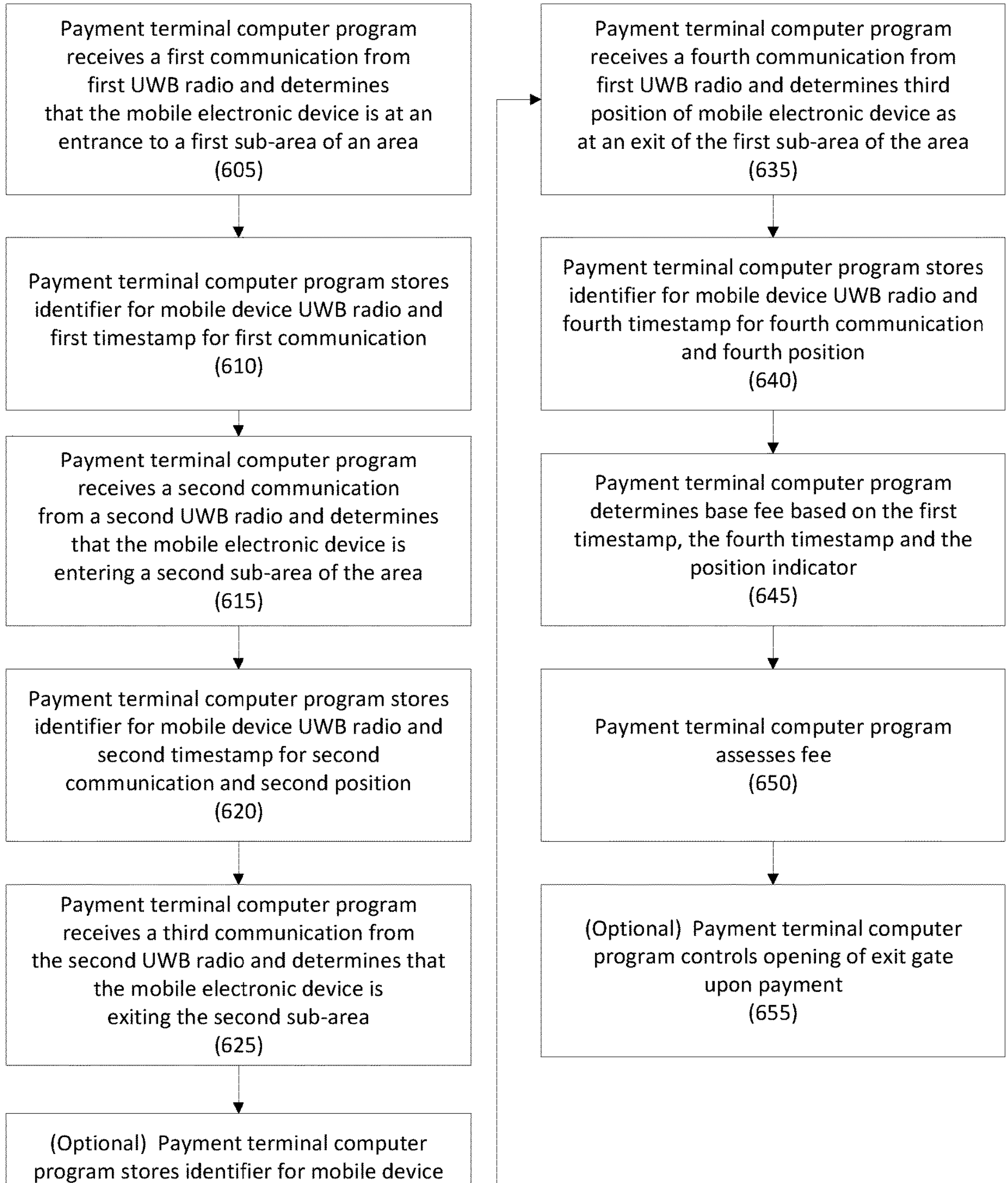
FIG. 6 depicts a method for tracking access to an area using ultra-wideband radio technology according to another embodiment.

Referring to FIG. 6, a for tracking entry to, presence in, and exit from an area using ultrawideband radio technology is disclosed according to an embodiment. For example, multiple UWB radios may be used to monitor distances between the UWB radios and a UWB-enabled device, such as a mobile electronic device.

In step 605, a payment terminal computer program 122 executed by a payment terminal may receive a first communication from a first UWB radio 124 and may determine that a mobile electronic device 170 is positioned at an entry for a first sub-area 530 of an area 510. In one embodiment, the first UWB radio 124 may be co-located with the payment terminal 120.

In one embodiment, the first communication may include information for payment terminal computer program 122 to determine the distance between the first UWB radio 124 and the mobile electronic device UWB radio 172 on the mobile electronic device 170. The payment terminal computer program 122 may then determine the position based on the distance. This may be similar to step 405, above.

The communication may include an identifier 173 for mobile electronic device UWB radio 172 in the mobile electronic device 170 that was sensed by the first UWB radio and a first timestamp associated with the communication. In step 610, the payment terminal computer program 122 may store the identifier 173 for mobile electronic device UWB radio 172 and a first timestamp for the first communication.

In step 615, the payment terminal computer program 122 may receive a second communication from a second UWB radio and may determine that a mobile electronic device is positioned at an access point between a first sub-area and a second sub-area of the area. For example, the second UWB radio may be located at the access point, such as on or near an access control device positioned between the first sub-area and the second sub-area. In one embodiment, the second communication may include information for payment terminal computer program 122 to determine the distance between the second UWB radio 524 and the mobile electronic device UWB radio 172 on the mobile electronic device 170. The payment terminal computer program 122 may then determine the position of the mobile electronic device based on the distance between the second UWB radio and the UWB radio on the mobile electronic device. For example, the payment terminal computer program 122 may determine that the UWB radio on the mobile electronic device is within a certain distance (e.g., 2 feet) of the access point. Because it is the first sensing of the UWB radio in the mobile electronic device, the payment terminal computer program 122 may presume that it indicates entrance to the second sub-area.

In one embodiment, the second UWB radio may be configured to operate with a range that indicates presence in an area between the first sub-area and the second sub-area. In such a case, no distance may be required, as the sensing indicates presence of the mobile electronic device in the second sub-area.

The second communication may include the identifier 173 for mobile electronic device UWB radio 172 in the mobile electronic device that was sensed by the second UWB radio and a second timestamp associated with the second communication. In step 620, the payment terminal computer program 122 may store the identifier 173 for mobile electronic device UWB radio 172 and the second timestamp for the second communication. The payment terminal computer program 122 may further store an indication that the mobile electronic device was in the second sub-area.

In step 625, the payment terminal computer program 122 may receive a third communication from a second UWB radio. Because it is the second sensing of the UWB radio in the mobile electronic device, the payment terminal computer program 122 may presume that it indicates exiting the second sub-area. The third communication may include the identifier 173 for mobile electronic device UWB radio 172 that was sensed by the second UWB radio and a third timestamp associated with the third communication. In step 630, the payment terminal computer program 122 may optionally store the identifier 173 for the mobile electronic device UWB radio 172 and the second timestamp for the second communication. For example, if fee for being in second sub-area is not time-based, the third communication may not be stored.

In step 635, the payment terminal computer program 122 may receive a fourth communication from the first UWB radio and may determine that the mobile electronic device is at an exit of the first sub-area of the area. In one embodiment, the fourth communication may include information for payment terminal computer program 122 to determine the distance between the first UWB radio 124 and the mobile electronic device UWB radio 172 on the mobile electronic device 170. The payment terminal computer program 122 may then determine the position based on the distance. For example, the payment terminal computer program 122 may determine that the mobile electronic device UWB radio 172 on the mobile electronic device is within a certain distance (e.g., 2 feet) of the payment terminal. Because the payment terminal may be positioned near the exit, this indicates that the user is leaving the area. In step 640, the payment terminal computer program 122 may store the identifier 173 for mobile electronic device UWB radio 172 and a fourth timestamp for the fourth communication in memory 128.

In step 645, the payment terminal computer program 122 may determine a base fee for access to the area based on the first timestamp (associated with entry to the area), the fourth timestamp (associated with exit from the area), and the position of the mobile electronic device in the second sub-area. In one embodiment, the base fee may be a flat fee, a time-based fee, may be based on the time of the first communication and/or the fourth communication (e.g., early bird/early departure), etc. The fee may further include a flat fee based on access to the second sub-area, time spent in the second sub-area, etc. In one embodiment, a minimum time spent in the second sub-area may be required before a fee is accessed. The base fee may then be adjusted by the secondary fee.

In step 650, the payment terminal computer program 122 may assess the fee for the access. In one embodiment, the payment terminal computer program 122 may charge an account on file associated with the mobile electronic device for the fee, may present the fee at an exit for automated or manual collection (e.g., credit card, account on file, etc.), etc. In step 655, once payment is received, the payment terminal computer program 122 may control an exit gate, turnstile, etc. to allow egress from the area once payment has been received.

It will be appreciated by persons skilled in the art that the present invention is not limited by what has been particularly shown and described hereinabove. Rather, the scope of the present invention includes both combinations and sub-combinations of features described hereinabove and variations and modifications thereof which are not in the prior art. It should further be recognized that these embodiments are not exclusive to each other.

It will be readily understood by those persons skilled in the art that the embodiments disclosed here are susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for tracking entry to, presence in, and exit from an area using ultrawideband (UWB) radio technology, comprising:

receiving, by a payment terminal computer program executed on a payment terminal and from an UWB radio, a first communication comprising first information for the payment terminal computer program to determine a first distance between a UWB radio-enabled mobile electronic device and the UWB radio;

determining, by the payment terminal computer program, that the UWB radio-enabled mobile electronic device is at an entrance to the area based at least in part on the first distance;

receiving, by the payment terminal computer program and from the UWB radio, a second communication comprising second information for the payment terminal computer program to determine a second distance between the UWB radio-enabled mobile electronic device and the UWB radio;

determining, by the payment terminal computer program, that the UWB radio-enabled mobile electronic device is at an exit from the area based at least in part on the second distance;

determining, by the payment terminal computer program, a fee based on the first communication and the second communication;

receiving, by the payment terminal computer program and from the UWB radio, a third communication comprising third information for the payment terminal computer program to determine a third distance between the UWB radio-enabled mobile electronic device and the UWB radio;

determining, by the payment terminal computer program, that the UWB radio-enabled mobile electronic device is in a sub-area of the area based at least in part on the third distance;

adjusting, by the payment terminal computer program, the fee based on the determination; and controlling, by the payment terminal computer program, an access control device in response to receipt of the fee.

2. The method of claim 1, further comprising:

storing, by the payment terminal computer program, a first timestamp for the first communication and an identifier for a mobile electronic device in the UWB radio-enabled mobile electronic device; and storing, by the payment terminal computer program, a second timestamp for the second communication and the identifier for a mobile electronic device in the UWB radio-enabled mobile electronic device.

3. The method of claim 2, wherein the fee is based on a time difference between the second timestamp and the first timestamp.

4. The method of claim 1, wherein the fee is a flat fee.

5. The method of claim 1, wherein:

the sub-area is a premium area and the fee is adjusted by increasing the fee; or the sub-area is a discount area and the fee is adjusted by decreasing the fee.

6. The method of claim 1, wherein the first information comprises first time of flight information between the UWB radio and the UWB radio-enabled mobile electronic device, and the second information comprises second time of flight information between the UWB radio and the UWB radio-enabled mobile electronic device.

7. A payment terminal device comprising:

a computer processor;

a memory comprising a payment terminal computer program; and an ultra-wideband (UWB) radio comprising a plurality of antennas;

wherein the payment terminal computer program is configured to:

receive a first communication from the UWB radio comprising first information for the payment terminal computer program to determine a first position of a UWB radio-enabled mobile electronic device;

determine that the UWB radio-enabled mobile electronic device is at an entrance to an area based at least in part on the first position;

receive a second communication from the UWB radio comprising second information for the payment terminal computer program to determine a second position of the UWB radio-enabled mobile electronic device;

determine that the UWB radio-enabled mobile electronic device is at an exit from the area based at least in part on the second position;

determine a fee based on the first communication and the second communication;

receive a third communication comprising third information for the payment terminal computer program;

determine that the UWB radio-enabled mobile electronic device is in a sub-area of the area;

adjust the fee based on the determination; and control an access control device in response to receipt of the fee.

8. The payment terminal device of claim 7, wherein the payment terminal computer program is further configured to:

store a first timestamp for the first communication and an identifier for a mobile electronic device in the UWB radio-enabled mobile electronic device; and store a second timestamp for the second communication and the identifier for a mobile electronic device in the UWB radio-enabled mobile electronic device;

wherein the fee is based on a time difference between the second timestamp and the first timestamp.

9. The payment terminal device of claim 7, wherein the payment terminal computer program is further configured to:

receive the third communication from the UWB radio comprising third information for the payment terminal computer program to determine a third position of the UWB radio-enabled mobile electronic device;

determine that the UWB radio-enabled mobile electronic device is in the sub-area of the area based at least in part on the third position; and adjust the fee based on the determination.

10. The payment terminal device of claim 9, wherein the sub-area is a premium area and the fee is adjusted by increasing the fee; or the sub-area is a discount area and the fee is adjusted by decreasing the fee.

11. The payment terminal device of claim 7, wherein the payment terminal computer program is further configured to:

receive the third communication from a second UWB radio indicating presence of the UWB radio-enabled mobile electronic device in the sub-area of the area; and adjust the fee based on the presence of the UWB radio-enabled mobile electronic device in the sub-area of the area.

12. The payment terminal device of claim 11, wherein:

the sub-area is a premium area and the fee is adjusted by increasing the fee; or the sub-area is a discount area and the fee is adjusted by decreasing the fee.

13. The payment terminal device of claim 7, wherein the first information comprises first time of flight information between the UWB radio and the UWB radio enabled mobile electronic device, and the second information comprises second time of flight information between the UWB radio and the UWB radio-enabled mobile electronic device.

* * * * *